US007841947B2

(12) United States Patent
Gauselmann

(10) Patent No.: US 7,841,947 B2
(45) Date of Patent: Nov. 30, 2010

(54) MULTICOLOR TOP LIGHT FOR GAMING MACHINES

(75) Inventor: Michael Gauselmann, Espelkamp (DE)

(73) Assignee: Atronic International GmbH, Lübbecke (DE)

( * ) Notice: Subject to any disclaimer, the term of this patent is extended or adjusted under 35 U.S.C. 154(b) by 1594 days.

(21) Appl. No.: 10/755,770

(22) Filed: Jan. 12, 2004

(65) Prior Publication Data

US 2005/0153780 A1 Jul. 14, 2005

(51) Int. Cl.
*A63F 13/02* (2006.01)

(52) U.S. Cl. ............................ 463/46; 463/30; 463/31; 463/47

(58) Field of Classification Search .................. 463/46, 463/47, 30–34
See application file for complete search history.

(56) References Cited

U.S. PATENT DOCUMENTS 6,014,594 A * 1/2000 Heidel et al. ................ 700/231
6,027,115 A * 2/2000 Griswold et al. ........ 273/143 R
6,043,615 A * 3/2000 Forbes ........................ 315/291
6,720,745 B2 * 4/2004 Lys et al. .................... 315/312
6,777,891 B2 * 8/2004 Lys et al. .................... 315/291

* cited by examiner

*Primary Examiner*—Melba Bumgarner
*Assistant Examiner*—Omkar Deodhar
(74) *Attorney, Agent, or Firm*—Patent Law Group LLP; Brian D. Ogonowsky

(57) ABSTRACT

In one embodiment of the invention, a top light is provided for a slot machine wherein the white light source and colored film is replaced by a red/green/blue light emitting diode (LED) source. The red, green, and blue components of the LED source are selectively controlled to produce any color and any effect (e.g., flashing) so as to generate any color code required in any jurisdiction without changing the top light for each jurisdiction.

22 Claims, 5 Drawing Sheets

MULTICOLOR TOP LIGHT FOR GAMING MACHINES

FIELD OF THE INVENTION

This invention relates to slot machines typically found in casinos and, in particular, to a top light for such slot machines.

BACKGROUND

There are many forms of slot machines found in casinos. Such slot machines typically consist of a housing, a display portion, processing circuitry, pay in and pay out mechanisms, player control devices, and a top light. The slot machine may play any game, such as randomly stopping motor-driven or simulated reels to obtain symbol combinations.

A light located on top of the slot machine (a top light) typically comprises two or three differently colored segments. Each segment is optically separated from an adjacent segment, and each segment contains a white light bulb. Surrounding each white light bulb in a segment is a colored film, such as a red, yellow, white, blue, or green film, which produces a red, yellow, white, blue, or green light when illuminated by the white light bulb. The light bulbs are selectively illuminated to create color codes for the casino operators or the players. For example, some color codes indicate the denomination of the slot machine. Other color codes, including flashing lights, convey to the casino operator that there is a malfunction, or that the coin hopper is full or empty, or that the player needs to paid out manually, or any other requirement.

One problem that exists with such top lights is that different jurisdictions, such as different states or different countries, use different codes for the top lights. This requires the manufacturer to provide different top light colors and different control software or hardware to produce the required top light codes for the jurisdiction.

What is desirable is a technique to reduce or eliminate the burden of changing the top light configuration for different jurisdictions.

SUMMARY

In one embodiment of the invention, a top light is provided for a slot machine wherein the white light source and colored film is replaced by a red/green/blue light emitting diode (LED) source. The red, green, and blue components of the LED source are selectively controlled to produce any color and any effect (e.g., flashing) so as to generate any color code required in any jurisdiction without changing the top light for each jurisdiction.

Only the software or a simple decoder chip needs to be changed for each jurisdiction. The top light software for every jurisdiction may be incorporated into each slot machine, and the applicable software may simply be selected while configuring the machine for that jurisdiction.

Various embodiments of the top light and its implementation are described.

DETAILED DESCRIPTION

Figure 1:
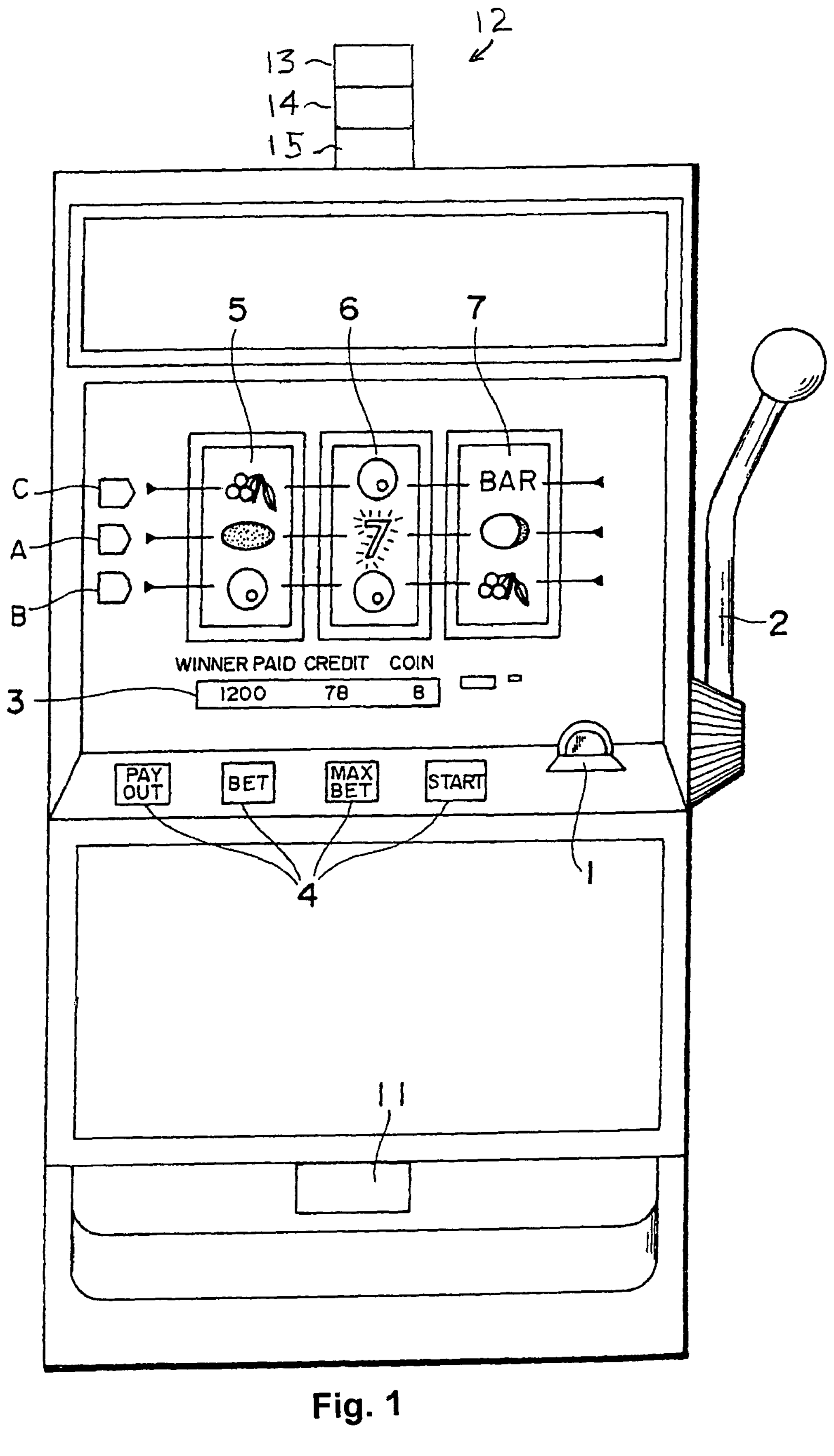
FIG. 1 is a front view of a typical slot machine with a cylindrical top light that may include the RGB LEDs of the present invention.

FIG. 1 illustrates one type of slot machine that may incorporate the inventive top light. The particular game performed by the slot machine is irrelevant to the invention. The game shown in FIG. 1 is a reel-type game where three reels are spun and randomly stopped to create a symbol combination across pay lines A, B, and C. Each symbol combination is associated with a different award.

The slot machine of FIG. 1 includes a coin slot 1, reel spin lever 2, meters 3, player input control buttons 4, reels 5, 6, and 7, coin output area 11, and top light 12. Top light 12 has three segments 13, 14, and 15, described in more detail below.

Figure 2:
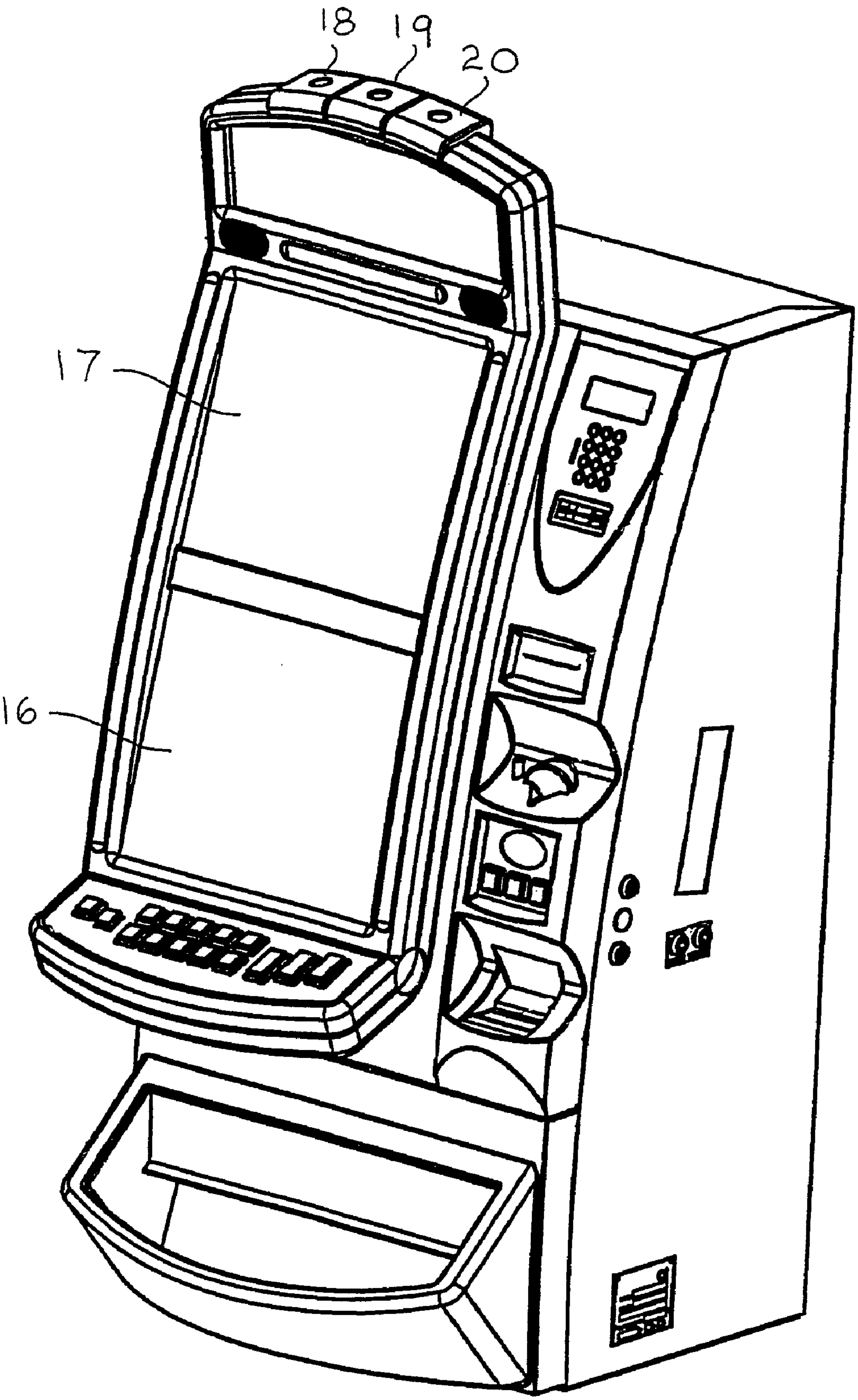
FIG. 2 is a perspective view of another type of slot machine having three separate top lights that perform the same function as the cylindrical top light of FIG. 1.

FIG. 2 illustrates another type of slot machine with various inputs for coins, bills, cards, or other types of credit input devices. Instead of motor-driven reels, video screens 16 and 17 are provided. Screens 16 and 17 may be CRTs, LCDs, thin film transistor (TFT) displays, or any other type of display. Instead of the cylindrical top light 12 in FIG. 1, the top light of the slot machine in FIG. 2 contains three side-by-side segments 18, 19, and 20.

Figure 3:
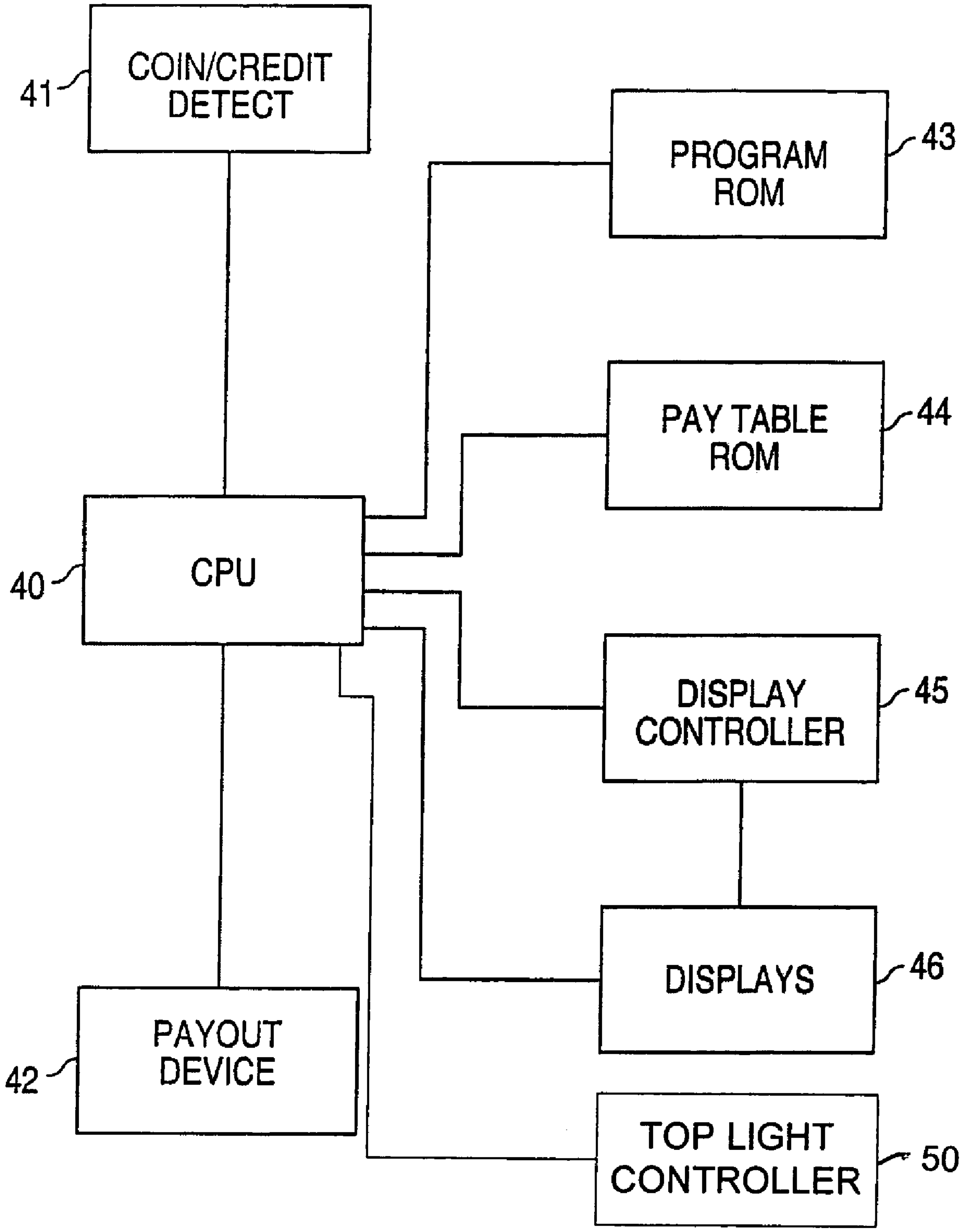
FIG. 3 illustrates basic functional units in the slot machines of FIGS. 1 and 2.

FIG. 3 illustrates certain functional blocks in the slot machines of FIGS. 1 and 2. A control unit (CPU 40) runs a gaming program stored in a program ROM 43. A coin/credit detector 41 enables the CPU 40 to initiate a next game. A pay table ROM 44 detects the outcome of the game and identifies awards to be paid to the player. A payout device 42 pays out an award to the player in the form of coins upon termination of the game or upon the player cashing out. A payout may also be in the form of a coded paper ticket, credits on a smart card or magnetic strip card, or in any other form. A display controller 45 receives commands from the CPU 40 and generates signals for the various displays 46. If a display 46 is a touch screen, player commands may be input through the display screen into the CPU 40.

Also connected to CPU 40 is a top light controller 50, which receives digital code signals from CPU 40 and translates those codes into control signals for the various LEDs within top light 12 of FIG. 1 and within segments 18-20 in FIG. 2, as described in detail below.

Figure 4:
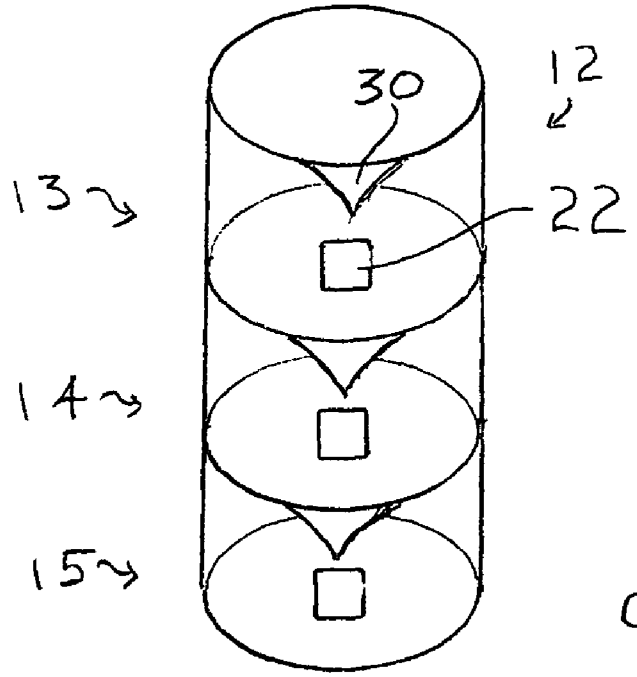
FIG. 4 is a perspective view of one type of top light incorporating the present invention.
Figure 5:
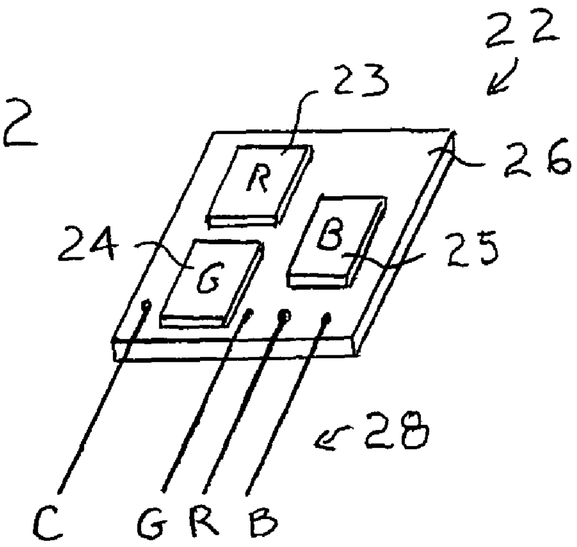
FIG. 5 is a close-up view of an RGB LED module.

FIG. 4 is a close-up perspective view of a cylindrical top light 12, such as the one shown in FIG. 1. Each section 13, 14, and 15 is optically sealed with respect to an adjacent section. On the bottom surface of each section are closely grouped red, green and blue LEDs. These three diodes may be purchased as a group of diodes in a single package (an RGB LED module 22) from many commercial sources. Once type of RGB LED module 22 is shown in FIG. 5 and comprises a red LED chip 23, a green LED chip 24, and a blue LED chip 25 mounted on a single substrate 26 where each color LED has a separate pin 28 for controlling the intensity of that diode. All three diodes have a common electrode extending from the package. Multiple RGB LED modules may be provided in each segment, if necessary to achieve the desired brightness, and connected in either series or parallel.

In the top light shown in FIG. 4, the RGB LEDs emit light in all directions and, due to the proximity of the three LEDs, their light is mixed so that a white light may be produced by all three LEDs emitting equal components of the white light. So that light emitted upwards by the LEDs is not wasted, a flared reflector 30 is provided over each LED module so that the light is equally distributed out the sides of the top light 12. No colored foil is needed around each segment since the desired color light is directly produced. A neutral color diffuser film for mixing the light colors forms the outer boundary of the cylindrical top light 12.

Figure 6:
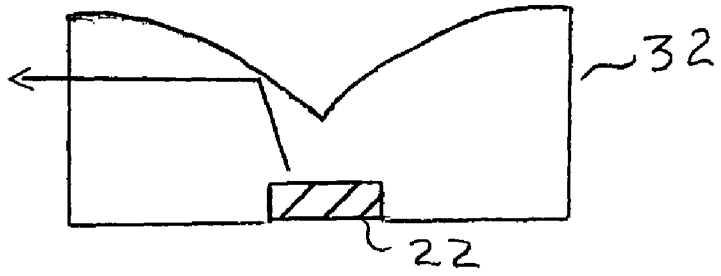
FIG. 6 is a side view of one embodiment of an RGB LED with side-emitting optics.

In another embodiment, shown in FIG. 6, the RGB LED module 22 is placed inside an epoxy collimator 32. All upward light from the LED module 22 is internally reflected sideways. The shape of the collimator determines the angular dispersion of the light.

High power red, green, and blue LEDs, either separate or in a single package, emit light that is brighter and purer than the corresponding color emitted by the prior art top light using an incandescent bulb and colored foil. The efficiency of the light output of combined red, green, and blue LEDs is improved over incandescent white light sources with colored foils. LEDs are also much more reliable than incandescent bulbs.

In a typical casino in the United States, the following codes for top lights are required, where the first color is for one segment of the top light, and the second color is for a second segment of the top light:

$0.01 white/white
$0.02 white/pink
$0.05 white/red
$0.10 white/green
$0.25 white/yellow
$0.50 white/orange
$1.00 white/blue
$1.50 white/purple
Door Open—top: off; center: off; bottom: slow flash (340 ms)
Change—top: on; center: off; bottom: off
Tilt—top: fast flash (170 ms); center: off; bottom: off
Hand Pay Jackpot—top: slow flash; center: off; bottom: slow flash
Bonus—top: off; center: short flash; bottom: off In the United States, typically only two segments in a top light are used. In other jurisdictions, three segments may be used having a different code from that described above.

Figure 7:
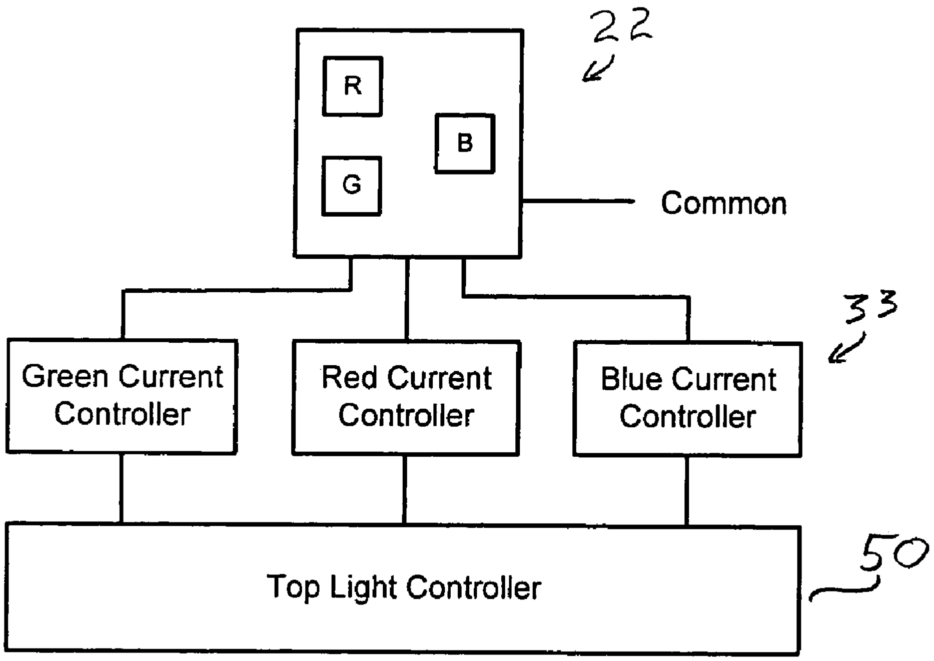
FIG. 7 is a schematic diagram of an RGB LED module whose red, green, and blue LEDs are selectively controlled by a top light controller.

FIG. 7 is a schematic diagram showing the power sources for controlling the brightness of the RGB components of the LED light source. The RGB LED module 22 will typically have a separate pin for the red LED cathode, the blue LED cathode, and the green LED cathode. The anodes of the three LEDs are made common. The data sheet for the particular RGB LED module purchased identifies the characteristics of the RGB LEDs and the maximum voltage that the LEDs can tolerate. The brightness of an LED is determined by the amount of current through the LED. The desired brightness of each LED for forming the various colors to be produced is associated with a particular current through each diode. Such specifications may be obtained either by testing or from the manufacturer.

As shown in FIG. 7, each LED lead of the LED module 22 is connected to a separate current controller 33 having a control terminal for controlling the amount of current through its associated LED. Power supply terminals and ground terminals are not shown for simplicity. The control terminals of the current controllers are connected to an output of a top light controller 50. FIG. 7 only shows the connection for one of the three RGB LED modules 22 in the top lights of FIGS. 1 and 2. The top light controller 50 will also control current controllers for each of the LEDs in the two additional segments.

Figure 8:
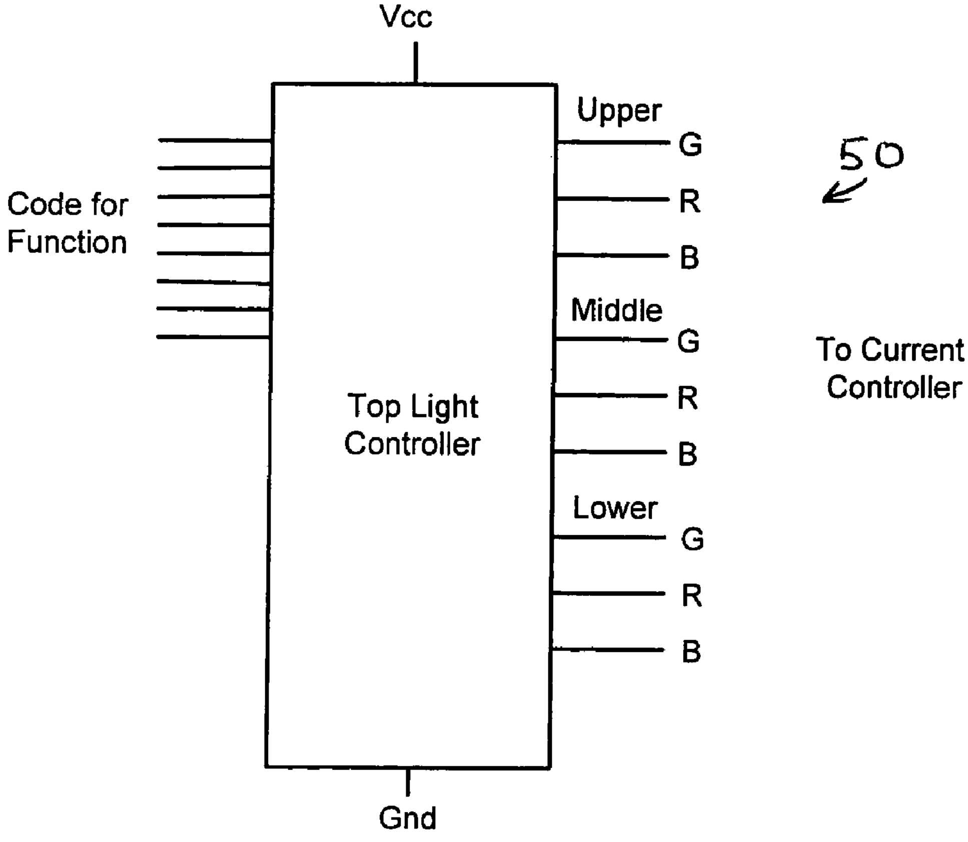
FIG. 8 illustrates one embodiment of a top light controller chip incorporating the circuitry of FIG. 7.

FIG. 8 illustrates one embodiment of a top light controller 50 chip. Controller 50 receives digital codes from the CPU 40 (FIG. 3) that specify the particular light code to be displayed by the top light. Controller 50 converts these digital codes to control signals for the various current controllers 33 to adjust the intensities of the RGB LEDs from anywhere between off to full power and may cause the LEDs to flash as appropriate. Controller 50 may contain firmware or other type of circuitry that may be easily programmed for the particular jurisdiction, or the CPU's digital code applied to the top light controller 50 may be selected for each jurisdiction in order to control the top light controller 50 output the appropriate control signals for the LEDs.

Accordingly, in order to change the top light control codes for any jurisdiction, only the top light controller chip needs to be changed, or a particular software algorithm needs to be changed for the jurisdiction. In one embodiment, each slot machine is programmed for all jurisdictions, and a simple flag is set when configuring the machine to identify the particular jurisdiction and top light codes. The top light controller may incorporate a programmable processor, a programmable gate array, or any other type of control device.

Some slot machines are able to accept a variety of denominations for making wagers (e.g., quarter, dollar). In one embodiment of the invention, control circuitry or software in the slot machine detects the present denomination being used in the machine and changes the top light colors accordingly. Therefore, the top light colors can be changed from game to game.

When applying the invention to the top light of FIG. 2, each segment 18, 19, and 20 can comprise a diffuser covering an RGB LED module, where each module is controlled as described with respect to FIG. 7.

Accordingly, this invention provides flexibility and reduced cost, both due to the elimination of the need to change the top light for each jurisdiction and due to the increased reliability of LEDs as compared to incandescent bulbs.

Having described the invention in detail, those skilled in the art will appreciate that, given the present disclosure, modifications may be made to the invention without departing from the spirit of the inventive concepts described herein. For example, a top light having only one segment may be satisfactory in some jurisdictions. Therefore, it is not intended that the scope of the invention be limited to the specific embodiments illustrated and described.

What is claimed is:

1. A gaming device comprising:

a housing;

a programmable top light on a top of the housing for conveying information about the gaming device, the top light comprising a plurality of segments, each segment comprising a combination of red, green, and blue light emitting diodes (LEDs);

a programmable controller electrically connected to each of the red, green, and blue LEDs in each segment, the controller comprising variable current sources connected to supply a controllable current to each of the red, green, and blue LEDs in each segment to control intensities of light emitted by each of the red, green, and blue LEDs in each segment; and the controller also comprising a programmable control portion that is programmable for controlling the variable current sources to supply selected currents to the red, green, and blue LEDs in each segment to cause any of a variety of colors to be emitted from each segment for conveying information about the gaming device, such that the programmable top light may be used in any of a variety of jurisdictions that have different specifications for the color of light emitted by each segment of a top light, the controller being programmed to cause each of the segments to emit one or more selected colors from the variety of colors that can be emitted from each segment.

2. The device of claim 1 wherein the plurality of segments is two segments.

3. The device of claim 1 wherein the plurality of segments is three segments.

4. The device of claim 1 wherein the red, green, and blue LEDs comprises a module containing a red LED chip, a green LED chip, and a blue LED chip.

5. The device of claim 1 wherein the variety of light colors for conveying information about the gaming device comprises flashing light.

6. The device of claim 1 wherein the top light forms a cylindrical structure.

7. The device of claim 1 wherein the top light comprises a plurality of segments side-by-side.

8. The device of claim 1 further comprising a display screen in the housing.

9. The device of claim 1 further comprising multiple reels in the housing.

10. The device of claim 1 further comprising a processor and a memory, the memory being programmed for generating top light control codes for at least one jurisdiction, the top light control codes being applied to at least one terminal of the controller to set a particular color emitted by each of the segments corresponding to the top light control codes.

11. The device of claim 1 further comprising a processor and a memory, the memory being programmed for generating top light control codes for multiple jurisdictions, the top light control codes being applied to at least one terminal of the controller to set a particular color emitted by each of the segments corresponding to the top light control codes.

12. The device of claim 1 further comprising at least one terminal of the controller receiving digital codes, wherein the controller converts the digital codes to corresponding currents applied to the red, green, and blue LEDs in each segment for controlling brightness levels of the red, green, and blue LEDs to set a particular color emitted by each of the segments corresponding to the digital codes.

13. The device of claim 1 wherein the red, green, and blue LEDs are controlled to convey a denomination of the gaming device.

14. The device of claim 1 wherein the red, green, and blue LEDs are controlled to convey maintenance information to an operator of the gaming device.

15. The device of claim 1 wherein the top light further comprises a light diffuser, at least partially surrounding the red, green, and blue LEDs, for mixing the light colors.

16. The device of claim 1 wherein the controller comprises a processor.

17. The device of claim 1 wherein the controller comprises firmware.

18. The device of claim 1 wherein the controller is programmed to cause the variable current sources to supply current ranging between zero current and a maximum current to the red, green, and blue LEDs in each segment.

19. A method for controlling a programmable top light on a gaming device, the top light comprising a plurality of segments, each segment comprising a combination of red, green, and blue light emitting diodes (LEDs) whose individual intensities are controllable to create a variety of light colors for conveying information about the gaming device, the method comprising:

programming a controller electrically connected to each of the red, green, and blue LEDs in each segment, programming the controller comprising controlling variable current sources to supply a controllable current to each of the red, green, and blue LEDs in each segment to control intensities of light emitted by each of the red, green, and blue LEDs in each segment to cause any of a variety of colors to be emitted from each segment for conveying information about the gaming device, such that the programmable top light may be used in any of a variety of jurisdictions that have different specifications for the color of light emitted by each segment of a top light; and applying currents, by the controller, to one or more of the red, green, and blue LEDs, corresponding to the programming of the controller, to control brightness levels of the red, green, and blue LEDs to convey information about the gaming device.

20. The method of claim 19 wherein applying currents to one or more of the red, green, and blue LEDs comprise applying currents to convey a denomination of the gaming device.

21. The method of claim 19 wherein applying currents to one or more of the red, green, and blue LEDs comprise applying currents to convey maintenance information to an operator of the gaming device.

22. The method of claim 19 further comprising detecting a change in a denomination being used in the gaming device and applying currents to one or more of the red, green, and blue LEDs to identify the denomination being actively used in the gaming device.

* * * * *